United States Patent

Braunstein

[15] 3,696,171
[45] Oct. 3, 1972

[54] POLYBUTYLENE TEREPHTHALATE-OXYMETHYLENE POLYMER COMPOSITIONS

[72] Inventor: David M. Braunstein, Edison, N.J. 08817

[73] Assignee: Celanese Corporation, New York, N.Y.

[22] Filed: Oct. 14, 1970

[21] Appl. No.: 80,765

[52] U.S. Cl. .................................................260/860
[51] Int. Cl. ............................................C08g 39/10
[58] Field of Search..............................260/860, 823

[56] References Cited

UNITED STATES PATENTS

| | | | |
|---|---|---|---|
| 3,342,892 | 9/1967 | Laakso et al. | 260/860 |
| R26,928 | 6/1970 | Miller et al. | 260/823 |
| 3,580,973 | 5/1971 | Kennedy et al. | 260/860 |
| 3,595,937 | 7/1971 | Weissermel et al. | 260/860 |

FOREIGN PATENTS OR APPLICATIONS 729,727    3/1966    Canada......................260/860

*Primary Examiner*—William H. Short
*Assistant Examiner*—Edward Woodberry
*Attorney*—Thomas J. Morgan, Linn I. Grim and Arnold Grant

[57] ABSTRACT

Process and resultant product for controlling the spherulite size of crystalline oxymethylene polymers. Control over the spherulite size is achieved by incorporating into the oxymethylene polymer a polyalkylene terephthalate. Additionally, the incorporation of the polyalkylene terephthalate into oxymethylene polymers improves the color stability when exposed to heat and/or ultraviolet light of the oxymethylene polymers.

10 Claims, No Drawings

POLYBUTYLENE TEREPHTHALATE-OXYMETHYLENE POLYMER COMPOSITIONS

The present invention relates to improved oxymethylene polymers (both homopolymers and copolymers) having controlled spherulite size, and having improved color stability when exposed to heat and/or ultraviolet light.

Oxymethylene polymers are distinguished by a number of excellent properties so that they are suitable for a variety of industrial applications. Many of these desirable properties, i.e., tensile strength and stiffness, are a result of the fact that these oxymethylene polymers (both homopolymers and copolymers) are crystalline polymers. Microscopic examination of thin sections of such polymers show that there is a non-uniform, coarse spherulitic structure with the average spherulite diameter being about 100 to 500 microns. It would be very desirable to control this spherulitic structure to produce oxymethylene polymers with a more uniform, finer spherulitic structure since this more uniform, finer spherulitic structure will improve the properties, such as tensile strength and stiffness of the oxymethylene polymers.

Additionally, these oxymethylene polymers are deficient in that the color stability of these polymers, when exposed to heat and/or ultraviolet light, is poor. That is when the oxymethylene polymer is exposed to heat and/or ultraviolet light, is for example when exposed to the atmosphere at elevated temperatures, the oxymethylene polymers undergo degradation which results in discoloration of the polymer.

The present invention is based on the discovery that a finer more uniform spherulitic structure can be achieved in oxymethylene polymers (both homopolymers and copolymers) by the incorporation therein of a polyalkylene terephthalate. This finer more uniform spherulitic structure will improve the physical properties such as tensile strength and stiffness of the oxymethylene polymer.

Additionally, it has been discovered that the incorporation of the polyalkylene terephthalate into oxymethylene polymers will improve the color stability of the polymers when exposed to heat and/or ultraviolet light.

The invention is accomplished by preparing a composition comprising a substantially homogenous admixture of a normally solid oxymethylene polymer containing at least 60 mole percent of recurring oxymethylene units and a polyalkylene terephthalate.

THE OXYMETHYLENE POLYMER

Oxymethylene polymers having recurring —$CH_2O$— units, have been known for many years. They may be prepared by the polymerization of anhydrous formaldehyde or by the polymerization of trioxane, which is a cyclic trimer of formaldehyde.

High-molecular-weight oxymethylene polymers have been prepared by polymerizing trioxane in the presence of certain fluoride catalysts. They may also be prepared in high yields and at rapid reaction rates by the use of catalysts, comprising boron fluoride coordination complexes with organic compounds, as described in U.S. Pat. No. 2,989,506 of Donald E. Hudgin and Frank M. Berardinelli.

Other methods of preparing oxymethylene polymers are disclosed by Kern et al. in Angewandte Chemie, 73 (6), 177–186 (Mar. 21, 1961), and in Sittig, "Polyacetals: What You Should Know," Petroleum Refiner, 41, 11, 131–170 (November 1962), including polymers containing repeating carbon-to-carbon single bonds in the polymer chain and which are made by copolymerizing trioxane with cyclic ethers, e.g., dioxane, lactones, e.g., betapropiolactone, anhydrides, e.g., cyclic adipic anhydride, and ethylenically unsaturated compounds, e.g., styrene, vinyl acetate, vinyl methyl ketone, acrolein, etc.

Also contemplated in the production of improved oxymethylene polymers according to the instant invention are oxymethylene polymers the end groups of which are reacted or "capped" with, for example, a carboxylic acid or a monomeric ether. Typical capping agents are alkanoic acids (e.g., acetic acid), which form ester end groups, and dialkyl ethers (e.g., dimethyl ether), which form ether end groups.

Still other oxymethylene polymers, more particularly copolymers, which are adapted for use in producing the improved oxymethylene polymers according to this invention are those which are prepared as described in U.S. Pat. No. 3,027,352 of Walling et al. by copolymerizing, for example, trioxane with any various cyclic ethers having at least two adjacent carbon atoms, e.g., ethylene oxide, dioxolane, and the like.

Thus, the oxymethylene copolymer used in carrying this invention into effect may be a polymer having a structure comprising recurring units represented by the general formula (I) 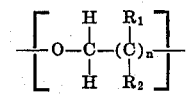

wherein each $R_1$ and $R_2$ is selected from the group consisting of hydrogen, lower alkyl and halogen-substituted lower alkyl radicals, and wherein $n$ is an integer from zero to three, inclusive, and $n$ being zero in from about 85 percent to 99.9 mole percent of the recurring units. Each lower alkyl radical preferably has from one to two carbon atoms, inclusive. The oxymethylene copolymer may be defined more specifically as a normally solid, substantially water-insoluble copolymer, the repeating units of which consist essentially of (A) —$OCH_2$— groups interspersed with (B) groups represented by the general formula (II) 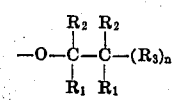

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three inclusive.

Each lower alkyl radical preferably has from one to two carbon atoms, inclusive. The —OCH$_2$— units of (A) constitute from about 85 to 99.9 mole percent of the recurring units. The units of (B) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers employed in making the oxymethylene copolymer are those represented by the general formula (III) 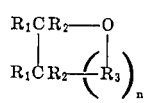

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene and lower alkyl and haloalkyl-substituted oxymethylene radicals, and $n$ is an integer from zero to three inclusive. Each lower alkyl radical preferably has from one to two carbon atoms inclusive.

The preferred cyclic ethers used in the preparation of the oxymethylene copolymers are ethylene oxide and 1,3-dioxolane, which may be represented by the formula

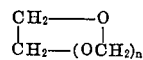

wherein $n$ represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalysts used in preparing the oxymethylene copolymers are the aforementioned boron fluoride coordinate complexes, numerous examples of which are given in the previously identified Walling et al. patent. Reference is made to this patent for further information concerning the polymerization conditions, amount of catalyst employed, etc.

The oxymethylene copolymers produced from the preferred cyclic ethers have a structure composed substantially of oxymethylene and oxyethylene groups in a ratio of from about 6 to 1 to about 1,000 to 1.

The oxymethylene copolymers described briefly above are members of the broader group of such copolymers that are useful in practicing the present invention and which have at least one chain containing recurring oxymethylene units interspersed with —OR— groups in the main polymer chain. In such —OR— groups, R represents a divalent radical containing at least two carbon atoms linked directly to each other and positioned in the polymer chain between the two valences with any substituents on said radical being inert, that is, substituents that are free from interfering functional groups and do not induce undesirable reactions under the conditions involved. Among such copolymers that advantageously may be employed in practicing this invention are oxymethylene copolymers containing from about 60 mole percent to 99.9 mole percent of recurring oxymethylene groups and from 0.1 mole percent to about 40 mole percent of —OR— groups. As indicated hereinbefore, the most preferred copolymers are those having from about 85 mole percent to 99.9 mole percent of recurring oxymethylene groups and from 0.1 to 15 mole percent of —OR— groups. In a preferred embodiment R may be, for example, an alkylene or substituted alkylene group containing at least two carbon atoms.

Also useful in carrying the instant invention into effect are oxymethylene copolymers having a structure comprising recurring units consisting essentially of those represented by the general formula (V) 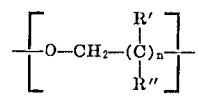

wherein $n$ represents an integer from zero to five, inclusive, and representing zero in from about 60 to 99.9 mole percent of the recurring units; and $R'$ and $R''$ represent inert substituents, that is, substituents which are free from interfering functional groups and will not induce undesirable reactions. Thus, one advantageously may utilize oxymethylene copolymers having a structure comprising oxymethylene and oxyethylene recurring units wherein from about 60 to 99.9 mole percent of the recurring units are oxymethylene units.

It has previously been indicated that especially preferred copolymers employed in practicing the present invention are those containing in their molecular structure oxyalkylene units having adjacent carbon atoms which are derived from cyclic ethers having adjacent carbon atoms. Such copolymers may be prepared by copolymerizing trioxane or formaldehyde with a cyclic ether represented by the general formula (VI) 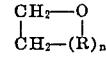

wherein $n$ represents an integer from zero to four, inclusive, and R represents a divalent radical selected from the group consisting of (a) $CH_2$, (b) $CH_2O$, and (c) any combination of $CH_2$ and $CH_2O$.

Examples of specific cyclic ethers that may be used in preparing copolymers of the kind embraced by Formula VI, in addition to the cyclic ethers previously mentioned with reference to the copolymers embraced by Formula IV, and of acetals and cyclic esters that may be employed instead of cyclic ethers, are 1,3,5-trioxepane, 1,3-dioxepane, betapropiolactone, gammabutylrolactone, neopentyl formal, pentaerythritol diformal, paraldehyde, and butadiene monoxide. In addition, glycols including, for example, ethylene glycol, diethylene glycol, 1,3-butylene glycol, propylene glycol and the like may be employed instead of the cyclic ethers, acetals and esters just mentioned.

Although formaldehyde is a desirable source of the oxymethylene moiety (i.e., $R_2O$ wherein $R_2$ represents methylene or substituted methylene), it will be understood, of course, by those skilled in the art that instead of formaldehyde, other sources of the oxymethylene moiety may be used; e.g., paraformaldehyde, trioxane, acetaldehyde, propionaldehyde, and the like. One may also employ cyclic acetals, e.g., 1,3,5-trioxepane, in lieu of both the cyclic ether and formaldehyde.

As used in the specification and claims, the term "oxymethylene polymers" denotes homopolymers and copolymers (including terpolymers, etc.) having at least 60 percent recurring oxymethylene units, and further includes substituted oxymethylene polymers, wherein the substituents are inert, i.e., do not participate in undesirable side reactions.

Also, as used in the specification and claims of this application, the term "copolymer" means polymers obtained by copolymerization of two or more different monomers (i.e., polymers containing in their molecular structure two or more different monomer units), and includes terpolymers, tetrapolymers and higher multicomponent polymers. The term "polymer" (unless it is clear from the context that the homopolymer or a copolymer is intended) includes within its meaning both homopolymers and copolymers.

In some cases it is especially desirable to use oxymethylene terpolymers as the oxymethylene polymer component of the compositions of this invention, e.g., in making molding compositions especially adapted for use in making blow-molded or otherwise shaped articles e.g., bottles or other types of containers. Oxymethylene terpolymers that are particularly useful in such applications, as well as for other purposes, include those disclosed in Great Britain Pat. No. 1,026,777 issued to W. E. Heinz and F. B. McAndrew on Apr. 20, 1966, assigned to the same assignee as the instant invention, and which by this cross-reference is made a part of the disclosure of the present application.

The oxymethylene polymers that are improved according to this invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene polymer component that is improved according to this invention may be, if desired, oxymethylene polymers that have been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in Canadian Pat. No. 725,734 issued to Frank M. Berardinelli on Jan. 11, 1966, assigned to the same assignee as the present invention, and which by this cross reference is made a part of the disclosure of the instant application.

Catalysts suitable for use in polymerizing trioxane or formaldehyde alone or with other copolymerizable components in producing the oxymethylene polymers that are improved according to this invention may be widely varied. Preferred catalysts are cationic catalysts, including such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride, and compounds containing these materials, such as boron fluoride coordinate complexes with organic compounds, particularly those in which oxygen or sulfur is a donor atom.

Other suitable catalysts include thionyl chloride, fluorosulfonic acid, methanesulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials, such as boron fluoride monohydrate, boron fluoride dihydrate and boron fluoride coordinate complexes with organic compounds as mentioned previously.

As indicated earlier in this specification, it is also within the purview of this invention to utilize oxymethylene polymers, including homopolymers of trioxane or of formaldehyde, the molecules of which have been "end-capped" by known methods of etherification or of esterification.

THE POLYALKYLENE TEREPHTHALATE

The polyalkylene terephthalate polymers with which this invention is concerned are of the general type described in U.S. Pat. No. 2,465,319 to Whinfield and Dickson, can be produced from the reaction product of a dibasic acid, such as terephthalic acid, or a dialkyl ester of terephthalic acid (especially dimethyl terephthalate), and diols having two to eight carbon atoms, preferably from two to four carbon atoms. Suitable diols include 1,3-propanediol, 1,4-butanediol, 1,3-butanediol, 1,2-propanediol, 1,2-butanediol, 2,3-butanediol, ethylene glycol, 1,5-pentanediol, 1,6-hexanediol, 1,7-heptanediol, 1,8-octanediol and the like.

The preferred polyalkylene terephthalates for use in the present invention are polyethylene terephthalate, polypropylene terephthalate and polybutylene terephthalate.

The range of intrinsic viscosity of the polyalkylene terephthalates for use according to the instant invention should be between from about 0.2 to about 1.2 deciliters per gram with the preferred range being between from about 0.5 to about 1.0 deciliters per gram as measured in meta-cresol.

The improved oxymethylene polymers of the present invention may be produced by preparing a substantially homogenous admixture comprising a normally solid oxymethylene polymer containing at least 60 mole percent of recurring oxymethylene units and a polyalkylene terephthalate. The polyalkylene terephthalate should be present in said admixture in amounts up to about 15 weight percent, preferably from about 0.01 to about 10 weight percent, and most preferably from about 0.5 to about 6 weight percent, based upon the weight of the total composition.

The admixture may be prepared by any means known to those skilled in the art whereby a substantially homogenous composition is obtained. For example, the polyalkylene terephthalate may be incorporated into the plastic oxymethylene polymer while the latter is being worked, e.g., on heated rolls or during passage through screw-type or other type of mixer-extruder apparatus, or the polyalkylene terephthalate may be dry blended with finely divided oxymethylene polymer and the blend then extruded to form a substantially homogenous admixture.

The improved oxymethylene polymers according to the present invention, may also include, if desired, plasticizers, reinforcing agents, fillers, pigments, antioxidants and the like.

In order that those skilled in the art may better understand how the present invention can be carried into effect, the following examples are given by way of illustration and not by way of limitation.

EXAMPLE I

The oxymethylene polymer (acetal polymer) used in this example is a trioxane-ethylene oxide copolymer containing about 2 weight percent of comonomer units derived from ethylene oxide. It is prepared as previously has been broadly described herein and more specifically in the cited art, e.g., the aforementioned Walling et al. U.S. Pat. No. 3,027,352. It is in flake form, and about 70 percent of the copolymer passes through a 40-mesh screen. It has an inherent viscosity (I.V.) of about 1.2 (measured at 60° C. in 0.1 weight percent solution in p-chlorophenol containing 2 weight percent of alpha-pinene). It has a melt index of about 9.0. (The apparatus used and method of determining melt index are described in ASTM D–1238–57T).

This polymer was extruded on a 1¾ inch Prodex vented extruder with an L/D of 20 to 1 at a melt temperature of between about 440° F., quenched and then pelletized and samples were prepared for physical testing by injection molding in a New Britain screw injection molding machine at a melt temperature of about 400° F., an injection pressure of 1,300 p.s.i., and a mold temperature of about 200° F.

A thin section of this polymer was viewed under a polarizing light microscope and showed a non-uniform, coarse spherulitic structure characteristic of semicrystalline oxymethylene polymer, with an average spherulite diameter of about 175 microns.

The physical properties of this polymer are reported in Table I.

TABLE I

| Ex. No. | Parts Oxymethylene polymer | Parts Polyalkylene terephthalate | Tensile strength (p.s.i.) | Tensile modulus (p.s.i. × 10⁵) | Flexural strength (p.s.i.) | Flexural modulus (p.s.i. × 10⁵) |
| --- | --- | --- | --- | --- | --- | --- |
| I | 100* | 0 | 8200 | 3.88 | 11,600 | 3.24 |
| II | 98* | 2** | 8800 | 4.0 | 12,500 | 3.62 |
| III | 98* | 2*** | 8700 | 4.04 | 12,500 | 3.64 |
| IV | 98* | 2**** | 8700 | 4.07 | 12,400 | 3.59 |

*Oxymethylene copolymer containing 2 weight percent of ethylene oxide comonomer
**Polyethylene terephthalate with an I.V. of 0.654 deciliters per gram
***Polypropylene terephthalate with an I.V. of 0.639 deciliters per gram
****Polybutylene terephthalate with an I.V. of 0.739 deciliters per gram

EXAMPLES II – IV

Several compositions were prepared by tumble blending 98 parts by weight of the oxymethylene copolymer of Example I with 2 parts by weight of;

II - polyethylene terephthalate having an intrinsic viscosity of 0.654 deciliters per gram as measured in meta-cresol;

III - polypropylene terephthalate having an intrinsic viscosity of 0.639 deciliters per gram as measured in meta-cresol; and IV - polybutylene terephthalate having an intrinsic viscosity of 0.739 deciliters per gram as measured in meta-cresol; and the blends were extruded as per Example I to form homogenous compositions, and samples were prepared for physical testing as per Example I.

Thin sections of each of these compositions were viewed under a polarizing light microscope and showed a finer more uniform spherulitic structure than the oxymethylene polymer of Example I, with the average spherulite diameter being about 52.4 microns.

The physical properties of these compositions are reported in Table I.

What this table describes is that the finer, more uniform spherulitic structure of oxymethylene polymers containing a polyalkylene terephthalate yields improved tensile strength and stiffness.

EXAMPLE V

An oxymethylene homopolymer with a molecular weight of about 35,000 was extruded and molded as per Example I, and thin sections were viewed under a polarizing light microscope and showed a non-uniform, coarse spherulitic structure characteristic of semicrystalline oxymethylene polymer, with an average spherulite diameter of about 105 microns.

EXAMPLE VI 98 parts by weight of the oxymethylene homopolymer of Example V was tumble blended with 2 parts by weight of polybutylene terephthalate, with an intrinsic viscosity of 0.739 deciliters per gram as measured in meta-cresol, and the blend was then extruded and molded as per Example I to form a homogenous composition.

Thin sections of this composition were viewed under a polarizing light microscope and showed a finer, more uniform spherulitic structure than the oxymethylene homopolymer of Example V, with the average spherulitic diameter being about 94 microns.

Polyethylene terephthalate and polypropylene terephthalate are substitutes for the polybutylene terephthalate of the instant Example with substantially similar results.

What this example describes is that the incorporation of a polyalkylene terephthalate into oxymethylene homopolymers produce an oxymethylene homopolymer with a finer, more uniform spherulitic structure.

EXAMPLE VII – IX

Several compositions were prepared containing:

VII - 100 parts by weight of the oxymethylene copolymer of Example I.

VIII - 98 parts by weight of the oxymethylene copolymer of Example I and 2 parts by weight of polyethylene terephthalate having an intrinsic viscosity of 0.654 deciliters per gram as measured in meta-cresol, as per the procedure of Examples II – IV; and IX - 98 parts by weight of the oxymethylene copolymer of Example I and 2 parts by weight of polybutylene terephthalate having an intrinsic viscosity of 0.739 deciliters per gram as measured in meta-cresol as per the procedures of Examples II – IV: to demonstrate that the incorporation of the polyalkylene terephthalates of the instant invention into oxymethylene copolymers yields color stabilized compositions.

The color of samples of the several compositions was measured on a Hunter Color Meter. The $L$, $a$, and $b$ values, corresponding to the degree of lightness, redness and yellowness respectively were measured.

The samples were then placed in an oven at 270° F. for 10 days and the $L$, $a$, and $b$ values were again measured.

The overall color change is defined as $(\Delta L^2 + \Delta a^2 + \Delta b^2)$.

The results are reported in Table II.

What this Table describes is that the incorporation of the polyalkylene terephthalate of the instant invention into oxymethylene copolymers yields color stabilized compositions.

TABLE II

| Ex. No. | Parts Oxy- meth- ylene poly- mer | Parts Poly- alkylene tereph- thalate | Original Color | | | Color After Heat Aging | | | Color change |
|---|---|---|---|---|---|---|---|---|---|
| | | | L | a | b | L | ti a | b | |
| VII | 100* | 0 | 82.2 | −1.5 | 5.4 | 76.8 | −1.5 | 5.4 | 10.8 |
| VIII | 98* | 2** | 87.4 | −1.1 | 1.4 | 86.1 | −1.2 | 4.0 | 2.90 |
| IX | 98* | 2*** | 90.7 | −0.7 | 1.2 | 89.9 | −1.2 | 4.1 | 3.05 |

*Oxymethylene copolymer containing 2 weight percent of ethylene oxide comonomer
**Polyethylene terephthalate with an I.V. of 0.654 deciliters per gram
*** Polybutylene terephthalate with an I.V. of 0.739 deciliters per gram

EXAMPLES X – XI

Several compositions were prepared containing:

X - 100 parts by weight of the oxymethylene homopolymer of Example V;

XI - 98 parts by weight of the oxymethylene homopolymer of Example V and 2 parts by weight of polybutylene terephthalate having an intrinsic viscosity of 0.739 deciliters per gram as measured in meta-cresol, as per the procedures of Example VI; to demonstrate that the incorporation of the polyalkylene terephthalates of the instant invention into oxymethylene homopolymer yields color stabilized compositions.

The color of each of these samples was measured on a Hunter Color Meter, and the $L$, $a$, and $b$ values were measured.

The samples were then placed in an oven at 270° F. for 10 days and the $L$, $a$, and $b$ values were again measured.

The results are reported in Table III.

What this table describes is that the incorporation of the polyalkylene terephthalates of the instant invention into oxymethylene homopolymers yields color stabilized compositions.

TABLE III

| Ex. No. | Parts Oxy- meth- ylene poly- mer | Parts Poly- alkylene tereph- thalate | Original Color | | | Color After Heat Aging | | | Color change |
|---|---|---|---|---|---|---|---|---|---|
| | | | L | a | b | L | a | b | |
| X | 100* | 0 | 90 | −0.8 | 9.4 | 80.8 | +1.2 | 17.9 | 12.7 |
| XI | 98* | 2** | 90.8 | 0.0 | 7.4 | 82.9 | +2.1 | 12.6 | 11.4 |

*Oxymethylene homopolymer
**Polybutylene terephthalate with an I.V. of 0.739 deciliters per gram It is to be understood that the foregoing detailed description is given merely by way of illustration and the many variations may be made therein without departing from the spirit and scope of the invention.

What is claimed is:

1. An improved oxymethylene polymer having a controlled spherulite size comprising a normally solid oxymethylene polymer having an inherent viscosity of at least 1.0 (measured at 60° C in a 0.1 weight percent solution in p-chlorophenol containing 2 weight percent of alpha-pinene) and containing at least 60 mole percent of recurring oxymethylene units having admixed therein polybutylene terephthalate with an intrinsic viscosity of between from about 0.2 to about 1.2 deciliters per gram as measured in meta-cresol, and present in amounts up to about 15 weight percent based upon the total weight of the composition.

2. The composition of claim 1 wherein said normally solid oxymethylene polymer is an oxymethylene homopolymer.

3. The composition of claim 1 wherein said polybutylene terephthalate has an intrinsic viscosity of between from about 0.5 to about 1.0 deciliters per gram as measured in meta-cresol, and is present in amounts from about 0.01 to about 10 weight percent based upon the total weight of the composition.

4. The composition of claim 3 wherein said oxymethylene polymer is an oxymethylene copolymer comprising from about 85 mole percent to 99.9 mole percent recurring —OCH$_2$— groups.

5. The composition of claim 4 wherein said polybutylene terephthalate is present in amounts of from about 0.5 to about 6 weight percent, based upon the total weight of the composition.

6. A process for the production of improved oxymethylene polymers having a controlled spherulite size which comprises admixing into a normally solid oxymethylene polymer having an inherent viscosity of at least 1.0 (measured at 60° C in a 0.1 weight percent solution in p-chlorophenol containing 2 weight percent of alpha-pinene) and containing at least 60 mole percent of recurring oxymethylene units a polybutylene terephthalate with an intrinsic viscosity of between from about 0.2 to about 1.2 deciliters per gram as measured in meta-cresol and present in amounts up to about 15 weight percent based upon the total weight of the composition.

7. The process of claim 6, wherein said normally solid oxymethylene polymer is an oxymethylene homopolymer.

8. The process of claim 6 wherein said polybutylene terephthalate has an intrinsic viscosity of between from about 0.5 to about 1.0 deciliters per gram as measured in meta-cresol, and is present in amounts from about 0.01 to about 10 weight percent based upon the total weight of the composition.

9. The process of claim 8 wherein said oxymethylene polymer is an oxymethylene copolymer comprising from about 85 mole percent to 99.9 mole percent recurring —OCH$_2$— groups.

10. The process of claim 9 wherein said polybutylene terephthalate is present in amounts of from about 0.5 to about 6 weight percent, based upon the total weight of the composition.

* * * * *